UNITED STATES PATENT OFFICE.

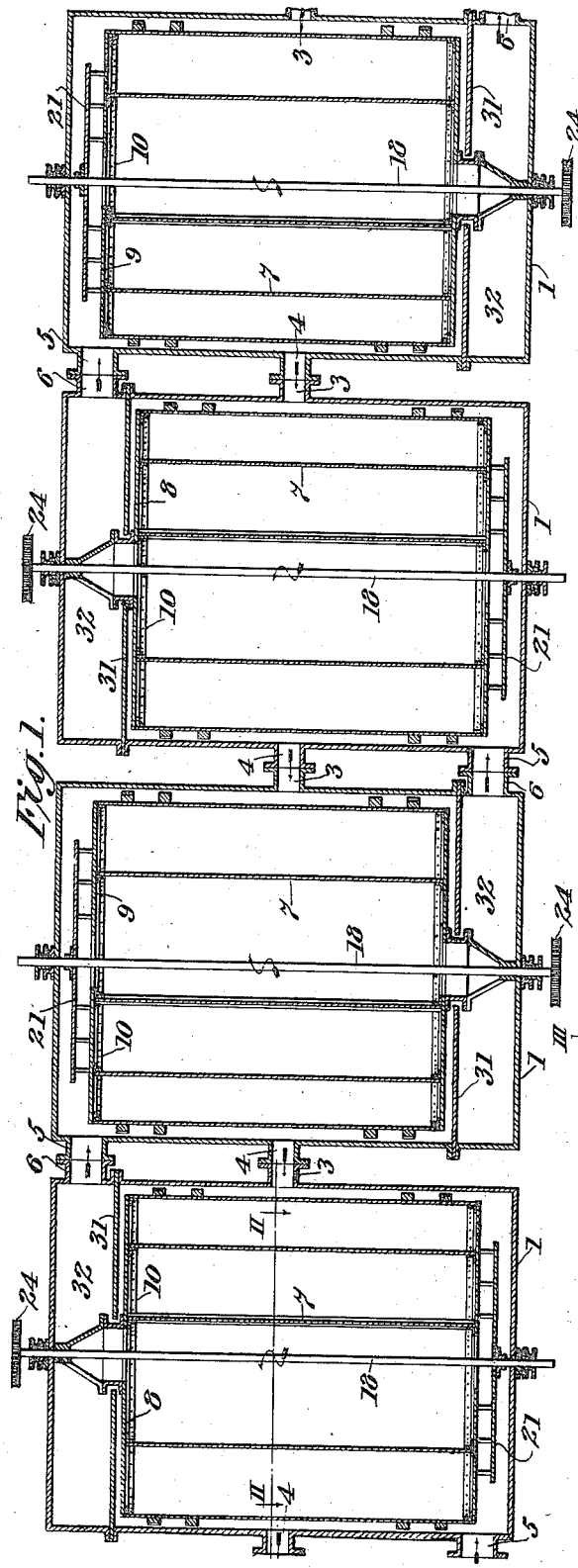

HANS A. FRASCH, OF NEW YORK, N. Y.

METHOD OF AND APPARATUS FOR CONVEYING AND ABSORBING GASES.

1,282,799.

Specification of Letters Patent.

Patented Oct. 29, 1918.

Application filed March 1, 1917. Serial No. 151,842.

*To all whom it may concern:*

Be it known that I, HANS A. FRASCH, a citizen of the United States, residing at New York, in the county of New York and State of New York, have invented a certain new and useful Improvement in Methods of and Apparatus for Conveying and Absorbing Gases, of which the following is a full, clear, and exact description.

The object of this invention is to provide a simple and economical method of and means for conveying gases and simultaneously scrubbing or washing them or absorbing them, as may be desired, by prolonged continuous exposure to or submersion and agitation in a liquid agent. This agent may be a solvent of the gas or constituent parts thereof, and also the absorbing medium, or it may be an indifferent liquid used only for the purpose of conveying or forcing the gas, or for scrubbing and removing mechanical impurities therefrom. In any case the agent constitutes a means for propelling and conveying the gas.

The invention consists in exposing the gas in a suitable casing or receptacle to the action of a rotary scroll-shaped drum, which is immersed, more or less, in a liquid agent within the casing, so that the revolving drum charges itself with the gas and liquid agent whenever the intake of the drum leaves and reënters the level of the agent, the drum in its revolution serving to convey both the gas and the liquid agent toward its center and finally discharging both of them through central outlets with which it is provided; and these outlets may open into the casing or receptacle containing the drum so that the gases may either be returned and conveyed through the same drum until they are completely freed from their impurities, or absorbed in the liquid agent; or said outlets may discharge the gas and liquid agent into a special compartment which may be connected with other similar machines in communication with one another in such manner that the gases may be passed successively from one to another for scrubbing or absorbing purposes, as I will proceed now to explain and finally claim.

In the accompanying drawings illustrating the invention, in the several figures of which like parts are similarly designated, Figure 1 is a horizontal section of a series of four communicating machines, the casing being cut also in the line of the gas passage.

Fig. 2 is a vertical cross-section on line II, II, Fig. 1, and Fig. 3 is a vertical longitudinal section on line III, III, Fig. 2.

1 is a tight casing or receptacle, mounted upon a suitable base 2, and having an inlet 3 for the brine, liquid agent, or absorbing solution and an opposite outlet 4 therefor, and a gas inlet 5 and a gas outlet 6. Within this casing is mounted the conveying member, in this instance comprising a scroll-shaped sheeting 7 mounted between heads 8 and 9 and constituting the scroll-shaped drum herein referred to, same being adapted to be rotated within the casing. As one way to build this device, I may use circular heads 8 and 9 of like diameter and provided with angle-irons 10 fixed to them and on which the sheeting 7 is fastened. The heads are provided with central openings 11 and 12 which serve as the starting point of the scroll sheeting and as the outlets or discharges of the scroll. Stays or brackets 13, see dotted lines Fig. 3, may be used at points desired to support the sheeting. The opening 11 is provided with a cylindrical extension 14 to which is applied a flange 15, and this flange has rigidly applied to it a spider 16 having a collar 17 in which is fixed a shaft 18 which is supported in fluid-tight bearings 19 and 20 at opposite ends of the casing. The other head 9 has applied to it a baffle plate 21 which has a collar 22 fixed to the shaft, and this baffle plate is held definitely spaced from the head 9 by stay-bolts 23 or other means, so as to control the efflux from the scroll through opening 12. On the shaft 18 is a gear wheel 24, band pulley or other driving agent by which the shaft may be turned and in turning carry with it the heads and their attached parts. As a separate or auxiliary rotating medium for the scroll sheeted drum member, toothed rings 25 may be applied circumferentially thereto, and these are engaged by pinions 26 on a shaft 27 having a power applying device 28; and to lighten the load on the driving mechanism the rotating member may be provided with track rings or rails 29 mounted to run on rollers 30.

A bridge plate 31 is placed parallel with the head 8 and depends from the top of the casing so as to form a compartment 32 which segregates the exhaust gas from the liquid agent. The lower end of this bridge plate being submerged in the liquid agent prevents the exhaust gas from returning to the body of the casing and allows only the liquid to pass and return to the body of the scroll casing while it forces the gas to pass on through the passages 5 and 6 into the next unit or absorber or elsewhere as desired.

The toothed rings and the rails may be further supported by braces 33 applied between the scroll sheeting and rings and rails.

Referring now to Fig. 1, where a series of four of the machines or units is shown, it will be observed that the units are arranged so that the gas outlets and the liquid agent outlets are coupled respectively with the inlets of the next machine, and thus the flow is from one machine to the next, the liquid agent flowing through the system in one direction and the gas in the reverse direction. Any number of units may be used in a given installation in order to get the desired effect.

While Fig. 1 shows the gas outlets in alternation, the receptacles (units) may also be provided with bridge plates 31 and extension outlets 14 in place of the baffle plates 21. so as to form separating compartments and gas outlets at both ends of the receptacle.

As stated, the liquid conveying agent for the gas may be of a nature to absorb the gas, or parts thereof. In either case when a number of units are used successively in a series, the agent is supplied to the last of the units of the series and the gas to the first of the units of the series, the agent flowing in a reverse direction to the current of gas, and being withdrawn finally from the first unit, while the purified or exhausted inert gas is discharged by the last unit of the series.

Using the manufacture of sodium bicarbonate by the ammonia process as an illustration of one application of my invention, but without thereby limiting its scope or adaptability, the operation is substantially as follows:—The casing is supplied with ammoniated salt brine and carbonic acid gas, and the scroll shaped drum is set in motion, with the result that the gas is conveyed into and through the bulk of the liquid, and while retaining the gas and the ammoniated brine within the drum, the two are thoroughly mixed, at the same time the sodium bicarbonate as it is formed is kept in thorough agitation with the brine and its settling is rendered impossible, and the blocking of the flow of brine and gas in the machine is prevented. By conveying the gas successively from one machine through another or others containing ammoniated brine, it becomes finally completely exhausted of carbon dioxid, the inert gases escaping from the last machine.

The exhaust gases may then be scrubbed and freed from ammonia by conveying them through one or more similar machines, fresh salt brine being used as the conveying agent, and this salt brine containing the absorbed ammonia is thereafter utilized in the process in the customary manner.

In the operation of the machine that part of the drum which is not immersed becomes filled with the gas above the liquid agent until the intake 34 of the drum again becomes immersed and sealed by such agent, whereby in the rotation of the drum the gas is forced toward the center or outlet 11 of the drum and is constantly agitated and brought into intimate contact with the agent, and compressed to a degree corresponding to the gravity of the column of liquid agent resting upon it, same being the difference of level of the agent between the intake and the central outlet 11 of the drum. The unabsorbed gas together with the partly or completely carbonated ammoniated brine is finally forced by the rotation of the drum through the central outlet 11 and the extension 14 into compartment 32, allowing the gas to escape into the compartment 32 and to pass on to the next machine, where the operation as described is repeated, and so on through the series of machines, and then through the final outlet to the scrubber. The ammoniated brine together with the sodium bicarbonate which forms in the course of passage through the system, and which is delivered together with the gas through the central outlet into the compartment 32 in each machine, returns by gravity below the bridge plate 31 back into the body of the casing. That portion of the ammoniated brine which represents the increase in quantity by the constant fresh addition of ammoniated brine, passes on from one machine to another through outlets 4 and inlets 3 until it finally leaves the apparatus as a mixture of sodium bicarbonate, ammonium chlorid and salt brine; and it is to be observed that the constant agitation produced by the revolution of the scroll-drums prevents the bicarbonate from settling during its passage through the system.

As already stated, the invention is applicable for any other purpose, where it is desired to convey large quantities of gas under a moderate pressure through a liquid scrubbing or absorbing medium.

By my invention I avoid the use of costly separate compressors and absorbers and facilitate and cheapen the production of the desired substance.

Variations in details of process and machine are permissible within the scope and purposes of the invention as herein claimed.

What I claim is:—

1. The method of conveying gases through a liquid agent, consisting in utilizing the liquid agent while in spiral motion as the gas propelling medium.

2. The method of conveying gases through a body of a liquid agent by means of the liquid agent, consisting in exposing the gas to the action of the liquid agent while the latter is in spiral motion.

3. The method of conveying gases by means of a liquid agent, consisting in exposing the gas to the action of the liquid agent while the latter is in spiral movement and conveying both gas and liquid agent toward the axis of motion and there discharging same.

4. The method of absorbing gas in a solvent liquid in a container, consisting in moving the liquid spirally and exposing the gas to the action of such liquid, and by the motion of the medium for moving the liquid charging said medium with the gas and the absorbing liquid and forcing the gas by means of said liquid toward the center of motion and thereby bringing it into intimate contact with the liquid, and allowing the liquid together with the unabsorbed gas to escape axially.

5. The method of absorbing gas in a solvent liquid within a suitable container, consisting in moving the liquid spirally and exposing the gas to the action of such liquid, charging the liquid-moving medium with the gas and the absorbing liquid by the spiral movement of the latter and forcing the gas by means of said moving liquid toward the center of motion and thereby bringing it into intimate contact with the liquid, and allowing the liquid together with the unabsorbed gas to escape axially from the liquid-moving medium and there discharging the unabsorbed gas together with the absorbing liquid, and allowing the unabsorbed gas to pass on, and returning the absorbing liquid for re-application.

6. In the manufacture of sodium bicarbonate by means of ammoniated salt brine and carbon dioxid, the method of conveying gases containing carbon dioxid and absorbing the same in ammoniated salt brine, consisting in imparting to the ammoniated brine and gases a spiral motion, and by the movement of the motion-producing medium charging said medium with the gas containing the carbon dioxid and with the ammoniated brine, and conveying the gas and brine toward the axial center of said medium and there allowing the brine and unabsorbed gas to escape.

7. In the manufacture of sodium bicarbonate by means of ammoniated salt brine and carbon dioxid, the method of conveying gases containing carbon dioxid and absorbing the same in ammoniated salt brine, consisting in imparting to the ammoniated brine a spiral motion within a casing and by rotating the medium for producing the spiral motion charging said medium with the gas containing the carbon dioxid and with the ammoniated brine, conveying the gas and brine to the center of said medium and thence segregating the ammoniated brine and the unabsorbed gas and returning the brine to the casing and allowing the gas to escape.

8. In the manufacture of sodium bicarbonate by means of ammoniated salt brine and carbon dioxid, the method of conveying gases containing carbon dioxid and absorbing the latter in ammoniated salt brine, consisting in imparting a spiral motion to the brine and gases, and charging the medium for imparting spiral motion with the gas containing the carbon dioxid and with the ammoniated brine, conveying the gas and brine to the center of said medium, thence segregating the ammoniated brine and the unabsorbed gas and returning the brine for re-application, subjecting the gas to any number of other similar treatments, and finally allowing the inert gas to escape.

9. In the process of manufacturing sodium bicarbonate by means of ammoniated salt brine and carbon dioxid, conducting the ammoniated brine successively through a series of machines in which it is subjected to spiral movement and simultaneously conducting the carbon dioxid through such machines in a reverse direction to the flow of the brine and into contact therewith, and withdrawing the resulting sodium bicarbonate together with the unconverted brine from the last of the series of machines, and allowing the refuse gas to escape from the first of the series of machines.

10. In an apparatus for conveying and absorbing gases, the combination of a casing having liquid and gas inlets and outlets, a scroll-shaped drum arranged in said casing and adapted to be partly immersed in the liquid and thereby liquid sealed against the escape of the gas to be absorbed, and means to rotate the drum.

11. In an apparatus for conveying and absorbing gases, a casing having liquid and gas inlets and outlets, a scroll-shaped drum mounted therein and composed of heads and a scroll-shaped sheeting fixed to said heads, said heads having central openings communicating with the casing, and the scroll forming a continuous passage from its periphery to its axial center and in line with the openings in the heads, and a shaft fixed to the heads and mounted to turn in the casing.

12. In an apparatus for conveying and absorbing gases, the combination of a casing having liquid and gas inlets and outlets, a scroll-shaped drum composed of heads and scroll-shaped sheeting fixed to said heads, and having a peripheral intake and an axial discharge through the heads, a shaft fixed to the heads and mounted to turn in the casing, and a baffle plate arranged on one of the heads and spaced apart from it.

13. In an apparatus for conveying and absorbing gases, the combination of a casing having liquid and gas inlets and outlets, a scroll-shaped drum composed of heads and scroll-shaped sheeting fixed to said heads, and having a peripheral intake and an axial discharge through the heads, a shaft fixed to the heads and mounted to turn in the casing, and a bridge plate arranged next to the gas outlet of the casing.

14. In an apparatus for conveying and absorbing gases, a casing having liquid and gas inlets and outlets, a scroll-shaped drum mounted therein and composed of heads and a scroll-shaped sheeting fixed to said heads, said heads having central openings and the scroll forming a continuous passage from its periphery to an axial discharge in line with the openings in the heads, a shaft fixed to the heads and mounted to turn in the casing, and auxiliary supports for the drum.

15. In an apparatus for conveying and absorbing gases, a casing having liquid and gas inlets and outlets, a scroll-shaped drum mounted therein and composed of heads and a scroll-shaped sheeting fixed to said heads, said heads having central openings and the scroll forming a continuous passage from its periphery to an axial discharge in line with the openings in the heads, a shaft fixed to the heads and mounted to turn in the casing, and auxiliary driving means for the drum.

16. In an apparatus for conveying and absorbing gases, a casing having liquid and gas inlets and outlets, a scroll-shaped drum mounted therein and composed of heads and a scroll-shaped sheeting fixed to said heads, said heads having central openings and the scroll forming a continuous passage from its periphery to an axial discharge in line with the openings in the heads, a shaft fixed to the heads and mounted to turn in the casing, toothed rings applied circumferentially to the drum, and driving pinions engaging said toothed rings.

17. An apparatus for conveying and absorbing gases by means of a liquid agent, comprising a series of similar machines connected in series, each comprising a casing having liquid and gas inlets and outlets, a scroll-shaped drum arranged in said casing and adapted to be partly immersed in the liquid and thereby liquid sealed against the escape of the gas to be absorbed, and means to rotate the drum, the several machines being connected to permit the flow of the liquid in one direction and the flow of the gas in a reverse direction.

In testimony whereof I have hereunto set my hand this 21st day of February, A. D. 1917.

HANS A. FRASCH.

Witnesses:
G. M. HEALEY,
G. F. SMITH.